United States Patent
Peet et al.

[11] Patent Number: 6,048,608
[45] Date of Patent: Apr. 11, 2000

[54] OPAQUE ORIENTED POLYPROPYLENE FILM

[75] Inventors: Robert G. Peet, Pittsford; Salvatore J. Pellingra, Jr., Wolcott, both of N.Y.; John P. DeLisio, Bridel, Luxembourg

[73] Assignee: Mobil Oil Corporation, Fairfax, Va.

[21] Appl. No.: 08/998,149

[22] Filed: Dec. 24, 1997

[51] Int. Cl.⁷ .................................. B32B 3/26; C08J 9/34
[52] U.S. Cl. ..................... 428/315.5; 428/315.9; 428/317.9; 428/318.8; 428/327; 428/910; 521/51; 521/81; 521/140
[58] Field of Search ............... 428/315.5, 315.9, 428/317.9, 319.7, 327, 910, 318.8; 521/51, 81, 134, 140

[56] References Cited

U.S. PATENT DOCUMENTS

| | | |
|---|---|---|
| 4,377,616 | 3/1983 | Ashcraft et al. . |
| 4,720,416 | 1/1988 | Duncan . |
| 4,758,462 | 7/1988 | Park et al. . |
| 4,965,123 | 10/1990 | Swan et al. . |
| 5,134,173 | 7/1992 | Joesten et al. . |
| 5,176,954 | 1/1993 | Keller et al. . |
| 5,188,777 | 2/1993 | Joesten et al. . |
| 5,223,346 | 6/1993 | Lu . |
| 5,629,398 | 5/1997 | Okamoto et al. . |

FOREIGN PATENT DOCUMENTS

| | | |
|---|---|---|
| 695778A2 | 6/1995 | European Pat. Off. . |
| 8-73618 | 3/1996 | Japan . |

OTHER PUBLICATIONS

WO 92/06123 Abstract, Apr. 4, 1992.

*Primary Examiner*—Blaine Copenheaver
*Attorney, Agent, or Firm*—Dennis P. Santini

[57] ABSTRACT

The present invention relates to an opaque, biaxially oriented polymeric film having a thermoplastic polymer matrix material within which is located a stratum of voids. The voids are formed during orientation by a cavitating agent which is a particle of a cyclic olefinic copolymer. The solid particle is phase-distinct and incompatible with the matrix material.

7 Claims, No Drawings

OPAQUE ORIENTED POLYPROPYLENE FILM

BACKGROUND OF THE INVENTION

The present invention relates to polypropylene films of high opacity and low light transmission, and particular to oriented films containing voids prepared from a film-forming polymer and particles of cyclic olefinic copolymers (COC) dispersed therein.

In the packaging of certain types of foods, such as snack foods like potato chips, cookies and the like, it is common practice to employ a multilayer film. A desirable property in such a packaging film is an opacity which protects the packaged product from deterioration caused by exposure to light. In particular, it has been found that certain wavelengths of light, up to about 450 nm cause increased spoilage in such packaged products. Even when a degree of opacity is present in the film, spoilage occurs if the film allows passage of some light. One way of increasing opacity in a multilayer film is by providing a layer or stratum of voids which hinders passage of light.

It is known to provide a layer of voids in thermoplastic films by loading cavitating agents in thermoplastic polymer which is cast into a film, and thereafter stretching to form oriented thermoplastic films. Different cavitating agents can be employed under particular processing conditions to obtain desired opaque, oriented polymeric films.

Attempts to vary the types of cavitating agents have been made to improve opacity and machinability of oriented polymeric films. For example, U.S. Pat. Nos. 4,758,462, and 5,176,954, disclose the use of organic polymers such as polybutylene terephthalates as cavitating agents in oriented polypropylene matrix materials. U.S. Pat. No. 4,758,462 to Park et al., relates to polymeric films of enhanced opacity and methods of making the same. The films of the '462 patent are made with a thermoplastic polymer matrix material within which is located a stratum of voids. The voids can be created by polybutylene terephthalate cavitating agents.

U.S. Pat. No. 5,176,954 to Keller et al., is directed to a non-symmetrically layered, highly opaque, biaxially oriented polymer film having a core layer which contains polybutylene terephthalate cavitating agents, as well as iron oxide, aluminum and titanium dioxide.

The polybutylene terephthalates described in the above patents, are good cavitating agents that can be processed at high temperatures (i.e., temperatures higher than the melting point of the matrix material). Polybutylene terephthalates, however, are sensitive to hydrolytic breakdown, and thus can degrade into lower molecular weight materials. These low molecular weight materials have been known to migrate to surfaces of processing apparatus, e.g., melt pipes, filters, dies, etc. These materials build up and can then eventually slough off the metal surfaces and pass into the films as sizable deposits of hard, eggshell-type impurities which cause the film to split.

Nylon cavitating agents, on the other hand, are not as likely to undergo hydrolytic breakdown and dispersion. However, nylon cavitating agents cannot generally be used at high temperatures. For example, U.S. Pat. No. 4,377,616 discloses that when nylons are used as cavitating agents in a polymeric matrix, the drawing temperature of the film can be quite close to the melting point of the polymeric matrix material.

Attempts have also been made to use other cavitating agents with a polymeric matrix to produce opaque, oriented films. In U.S. Pat. Nos. 5,134,173 and 5,188,777 to Joesten et al., cross-linked polystyrenes are used as cavitating agents to make opaque, biaxially oriented polymeric films.

The present invention overcomes shortcomings of the prior art and improves the manufacturing capability for making biaxially oriented polymeric films which are provided with opacity by use of cavitating agents.

SUMMARY OF THE INVENTION

The present invention is an opaque, biaxially oriented polymeric film having a thermoplastic polymer matrix material within which is located a stratum of voids. The voids are formed during orientation by a cavitating agent which is a particle of a cyclic olefinic copolymer. The solid particle is phase-distinct and incompatible with the matrix material.

The thermoplastic matrix polymer, of which the opaque film of this invention is composed, can be any thermoplastic polymer which is incompatible with cavitating agents of cyclic olefinic polymers. Preferably, the polymeric matrix material is a polyolefin such as polyethylene, polypropylene, polybutylene, etc. The most preferred polyolefin is polypropylene.

The cavitating agent of the present invention is a cyclic olefinic copolymer formed by copolymerizing a cyclic olefin with an aliphatic olefin in the presence of metallocene or Ziegler-Natta catalysts. The cyclic olefinic copolymer of the present invention has a transition temperature identified as Heat Deflection Temperature (HDT) of 75° C.–220° C., more preferably, about 130° C. to about 180° C. Typical grades of such cyclic olefin copolymers are Topaz resins 6015 and 6017, obtained from Ticona, the technical polymers business of Hoechst.

Examples of the cyclic olefin monomers that can be used in the copolymers include, but are not limited to, $C_4$ to $C_{12}$ Cyclic olefins, including substituted norbornenes.

Examples of the aliphatic comonomers include, but are not limited to ethylene, propylene, and butylene, preferably ethylene.

The polymeric film of the present invention can optionally have at least one void-free thermoplastic skin layer on at least one of its surfaces.

As a result, the present invention advantageously provides an opaque, biaxially oriented polymeric film containing cavitating agents of cyclic olefinic copolymer which do not undergo hydrolytic breakdown during manufacture. This reduces deposition of unwanted low molecular weight materials, thereby improving processability, reducing manufacturing costs and improving film quality. Additionally, the film of the present invention can advantageously be processed at high temperatures without undergoing hydrolytic breakdown.

For a better understanding of the present invention, together with other and further objects, reference is made to the following description and its scope will be pointed out in the appended claims.

DETAILED DESCRIPTION OF THE INVENTION

The present invention relates to an opaque, biaxially oriented polymeric film having a thermoplastic polymer matrix material within which is located a stratum of voids. The voids are formed during orientation by a cavitating agent which is a particle of a cyclic olefinic copolymer. The solid particle is phase-distinct and incompatible with the matrix material.

The film of the present invention has been described above as having a thermoplastic polymer matrix material within which is located a stratum of voids. From this it is to be understood that the voids are a dispersed phase in the matrix configuration. The term "stratum" is intended to convey the understanding that there are many dispersed voids in the matrix and the voids themselves are oriented so that the two major dimensions are aligned in correspondence with the directions of orientation of the polymeric film structure.

Cavitating agents are void initiating particles that are incompatible with, or have very low compatibility with, the polymer that constitutes the essentially continuous phase of the matrix. The void initiating particles constitute a dispersed phase that will, ultimately, upon orientation, form a stratum of voids in the polymeric matrix.

After each void has been formed through the cavitation caused by the described particle, the particle generally contributes little else to the system. This is because its refractive index can be close enough to the refractive index of the polymer that constitutes the essentially continuous phase of the matrix that it makes no contribution to opacity. When this is the case, the opacity is principally a function of the light scattering effect which occurs because of the existence of the voids in the system.

The typical void of the resultant film is defined as having major dimensions X and Y, and minor dimension Z, where dimension X is aligned with machine direction orientation, dimension Y is aligned with transverse direction orientation, and dimension Z is aligned in the thickness direction of the film and approximately corresponds to the cross-sectional dimension of the spherical particle which initiated the void.

It is a necessary part of the present invention that the orientation conditions be such that the X and Y dimensions of the voids of the film be major dimensions in comparison to the Z dimension. Thus, while the Z dimension generally approximates the cross-sectional dimension of the spherical particle initiating the void, X and Y dimensions will be significantly greater.

The thermoplastic polymer that constitutes the essentially continuous phase of the matrix, of which the greater portion of the opaque film of this invention is comprised, can be any thermoplastic polymer which is "incompatible" with cavitating agents of cyclic olefinic copolymers. The term incompatible means that the two materials (i.e., thermoplastic polymer material and cavitating agent) will maintain their identities after they have been mixed above the melting point of the thermoplastic polymer matrix material.

Examples of such thermoplastic polymer matrix material include polyolefins, e.g., polyethylene, polypropylene, polybutylene, etc. Distinct species of these materials are copolymers of ethylene with alpha-olefins, e.g., butene, hexene, etc., random copolymers of propylene with another olefin, e.g., ethylene, butene, hexene, etc., and any blends or mixtures of the same. Particularly preferred as the matrix polymer is isotactic polypropylene. Typical polypropylene homopolymers used commercially include PP4612E2, obtained from Exxon Corp. and 10-6371, obtained from Amoco Chemical Co.

The cavitating agent of the present invention is a cyclic olefinic copolymer formed by copolymerizing a cyclic olefin with an aliphatic olefin in the presence of metallocene or Ziegler-Natta catalysts. Typical grades of such cyclic olefin copolymers are Topaz resins 6015 and 6017, obtained from Ticona, the technical polymers business of Hoechst.

The copolymerization of the cyclic olefin and the aliphatic olefin can be prepared by appropriate means known in the art.

Typically, the polymerization is conducted in a reaction medium conducive to interaction of a metallocene catalyst and the desired monomers. Thus, a slurry of a metallocene catalyst in liquid aliphatic olefin may serve as the reaction medium. Similarly, a solution process using typical hydrocarbon solvents will be suitable, preferably the solvent is one of aromatic or cycloaliphatic hydrocarbon compounds, but linear or branched aliphatic compounds will also be suitable. Suitable solvents include conventional solvents known in the art, such as benzene, toluene, xylene, ethylbenzene, cyclopentane, cyclohexane, methylcyclohexane, pentane, hexane, heptane, octane, mineral oil, blends of solvents, etc.

The aliphatic olefin of the present invention is the primary monomer. Examples of the primary monomer include ethylene, propylene, and butylene, preferably ethylene.

The resultant cyclic olefinic copolymer has a transition temperature, typically described as a Heat Deflection Temperature (HDT) suitably close to the melting point of the thermoplastic polymer that constitutes the essentially continuous phase of the matrix to allow solidification from the melt into a separate phase of small particles dispersed in the continuous polymeric matrix. The HDT of the cyclic olefinic copolymer is about 75° C. to about 220° C., preferably about 130° C. to about 180° C., more preferably, about 150° C. to about 170° C.

The resultant cyclic olefinic copolymers produced can be reasonably easily dispersed in the polymer matrix, and are reasonably incompatible with the polymer that constitutes the essentially continuous phase of the matrix so that the forces pulling on the polymers during the orientation steps will create a rupture at the interface between the two polymers. The cyclic olefinic copolymers can be reclaimed back into production, and do not degrade into unwanted by-products at the conditions of the process.

Because of the film core cavitation resulting from the cyclic olefinic copolymer, the present invention provides a light transmission of less than 40% and an opacity of at least 10%. More preferably light transmission will be less than 25% and opacity will be at least 75%.

The film of the present invention has very high opacity and very low light transmission. A distinction must be made between opacity and light transmission for the purposes of this invention. Opacity is the opposite of transparency and is a function of the scattering and reflection of light transmitted through the film. Opacity of a film is the ability, for example, to block out writing underneath the film. Light transmission is a function of light passing more directly through the film. Accordingly, a highly reflective film may provide high opacity while allowing light transmission. This is because percent light transmission is not the obverse of percent opacity.

Light transmission is the amount of light passing directly through the film. To prevent food spoilage, decreased light transmission is desirable. Prevention of light transmission in shorter UV wavelengths up to 400 nm and the blue-violet range of from 400 to 450 nm is particularly desirable for this purpose.

The film of the present invention can be prepared by any manner well known in the art, preferably by coextrusion. The polymer that constitutes the essentially continuous phase of the matrix and the cyclic olefinic copolymer that are to be extruded into a film may be prepared by thoroughly mixing the constituent materials at a temperature above the melting point of the matrix polymer. Such mixing may be conveniently accomplished on the extruder utilized to form the initial film which is subsequently biaxially oriented.

The cyclic olefinic copolymer can be present in the resultant film, for example, in up to about 30% by weight of the cavitated layers of the film, preferably from about 3 to about 15% by weight, more preferably from about 5 to about 12% by weight.

In forming the thermoplastic polymer matrix, as in U.S. Pat. No. 4,377,616, the disclosure of which is incorporated herein by reference in its entirety, a master batch technique can be employed in creating the void initiating particles in situ. After the formation of a master batch, appropriate dilution of the system can be made by adding additional thermoplastic matrix material until the desired proportions are obtained. However, the components may also be directly mixed and extruded instead of utilizing a master batch method.

When a master batch precursor composition is made for ultimate dilution with more polymer that constitutes the essentially continuous phase of the matrix to produce the final film, the master batch can contain as much cyclic olefinic copolymer as can practically be dispersed in dispersed in the thermoplastic matrix polymer in spherical subdivided particles of a size ranging from about 0.1 to about 10 microns. With little difficulty, up to about 30% by weight of the cyclic olefin copolymer can be dispersed, in this size range, in the matrix.

The general method of forming the opaque oriented film of the present invention is accomplished by slot extruding a film consisting of the polymer that constitutes the essentially continuous phase of the matrix and cyclic olefinic copolymer mixed together, and thereafter sequentially biaxially orienting the film. During the orientation a stratum of voids is formed in the matrix. As indicated above, the polymer that constitutes the essentially continuous phase of the matrix and the void initiating particle must be incompatible, or have very low compatibility, and this term is used in the sense that the materials maintain two distinct phases. The void initiating particles constitute a dispersed phase throughout the lower melting polymer which polymer will, ultimately, upon orientation, become void-filled with the spherical particles positioned somewhere in the voids.

Since the cyclic olefinic copolymer particles are incompatible with the polymer that constitutes the essentially continuous phase of the matrix material, during machine direction-orientation each sphere tends to create a streamlined void. During subsequent transverse orientation, the transverse dimension of this void is correspondingly increased. These steps cause the film to generate a bright white, pearlescent, opaque appearance.

In many instances, for improved process operability and in order to minimize the formation of an irregular surface as a result of the spheres and the cavitated condition of the film, a coextruded skin layer can be formed on one or both surfaces of the cavitated layer. This coextruded skin layer can be transparent or pigmented and of the same or different material as the polymer matrix. The different material may be chosen for particular characteristics, for example, film strength and integrity, heat sealability, printability, machinability, etc. Further coextruded layers can be produced on one or both surfaces of the multi-layer films. The material for these layers may again be chosen for particular characteristics, such as film strength and integrity, heat sealability, printability, machinability, etc.

When employing a surface or skin layer or layers, it is preferred that the core thickness be from about 30% to about 95% of the overall structure. Conversely, it is preferred that the combined skin thickness be about 5 to about 70% of the overall film thickness. When desired or necessary, the skin layers can be sufficiently thick so that the outer surfaces thereof do not manifest any irregularities or surface projections of the core material The film of the present invention has a thickness ranging from about 0.5 mils to about 4.0 mils, preferably from about 0.7 mils to about 3.0 mils, and more preferably from about 0.8 mils to about 2.5 mils.

As a result of the biaxial orientation of the film structure herein, in addition to opacifying the core layer of the structure, the orientation improves other physical properties of the composite layers such as flex-crack resistance, Elmendorff tear strength, modulus, elongation, tensile strength, impact strength, etc. The resulting film can have, in addition to a rich high quality appearance and excellent opacifying characteristics, low water vapor transmission rate characteristics and low oxygen transmission rate characteristics. This makes the film ideally suited for packaging food products including liquids.

It is believed that the voids are closed cells. This means that there is virtually no path open from one side of the core to the other through which liquid or gas can traverse.

EXAMPLES

The following examples illustrate the present invention. Example 1 below is a comparative example illustrating the light transmission of the prior art films. Examples 2 and 3 illustrate the properties exhibited by the films of the present invention.

Example 1

Comparative Example

A white film with a cavitated core was tested for light transmission. The film had a cavitated isotactic polypropylene (PP) core with 5% polybutylene telephthalate (PBT) filler and skins of PP homopolymer, in a thickness of 0.20 mil., on each side. Total cavitated film thickness was about 1.6 mil.

The film had a light transmission of 25.8%. Opacity was 85.1%.

Example 2

A white film with a cavitated core was produced, using 8% of a COC having a 170° C. HDT dispersed in an isolactic polypropylene homopolymer matrix. All other conditions were essentially the same as in Example 1. The cavitated film thickness was about 1.5 mils. The light transmission was 20.9% and the opacity was 87.9%.

Example 3

A white film with a cavitated core was produced, using 20% of a COC having a 150° C. HDT dispersed in an isotactic polypropylene homopolymer matrix. All other conditions were essentially the same as in Example 1. The cavitated film thickness was about 1.6 mils. The light transmission was 20% and the opacity was 87.9%.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. An opaque, biaxially oriented polymeric film comprising:
   a thermoplastic polymer which constitutes a continuous phase of a matrix within which is located a stratum of voids, said voids formed during orientation by a cavitating agent constituting a dispersed phase, said agent comprising solid cyclic olefinic copolymer particles which are formed by copolymerizing a cyclic olefin with an aliphatic olefin in the presence of a metallocene catalyst and which are phase-distinct and incompatible with said matrix.

2. The film of claim 1, wherein said polymer which constitutes said continuous phase of the matrix is polypropylene.

3. The film of claim 1, wherein said copolymer has a Heat Deflection Temperature of about 75° C. to about 220° C.

4. The film of claim 1, wherein said cyclic olefin is selected from the group consisting of $C_4$ to $C_{12}$ olefins.

5. The film of claim 1, wherein the aliphatic olefin monomer is ethylene.

6. The film of claim 1, wherein said aliphatic olefin monomer is selected from the group consisting of ethylene, propylene, and butylene.

7. The film of claim 1 having on at least one surface thereof a void-free thermoplastic skin layer.

* * * * *